(12) United States Patent
Morton et al.

(10) Patent No.: US 10,935,945 B2
(45) Date of Patent: Mar. 2, 2021

(54) METHODS AND APPARATUS FOR POWER GENERATION AND DISTRIBUTION

(71) Applicants: Arizona Public Service Company, Phoenix, AZ (US); PowerSecure, Inc., Wake Forest, NC (US)

(72) Inventors: David G. Morton, Chandler, AZ (US); John E. Pinho, Gilbert, AZ (US); Mark Martyak, Raleigh, NC (US)

(73) Assignees: Arizona Public Service Company, Phoenix, AZ (US); Powersecure, Inc., Wake Forest, NC (US)

( * ) Notice: Subject to any disclaimer, the term of this patent is extended or adjusted under 35 U.S.C. 154(b) by 0 days.

(21) Appl. No.: 16/271,190

(22) Filed: Feb. 8, 2019

(65) Prior Publication Data

US 2019/0258212 A1  Aug. 22, 2019

Related U.S. Application Data

(63) Continuation-in-part of application No. 16/040,257, filed on Jul. 19, 2018.
(Continued)

(51) Int. Cl.
*G05B 19/042* (2006.01)
*H02J 3/38* (2006.01)
(Continued)

(52) U.S. Cl.
CPC ............. *G05B 19/042* (2013.01); *G05F 1/66* (2013.01); *H02J 3/32* (2013.01); *H02J 3/38* (2013.01);
(Continued)

(58) Field of Classification Search
CPC .. G05B 19/042; G05F 1/66; H02J 3/14; H02J 3/32; H02J 3/38; H02J 3/383; H02J 3/48
(Continued)

(56) References Cited

U.S. PATENT DOCUMENTS 8,427,005 B1  4/2013  Kisner et al.
2008/0058997 A1  3/2008  Timblin
(Continued)

OTHER PUBLICATIONS

California ISO, "Frequency Response Phase 2 Issue Paper," Dec. 15, 2016.

*Primary Examiner* — Michael R. Fin
(74) *Attorney, Agent, or Firm* — The Noblitt Group, PLLC

(57) ABSTRACT

Methods and apparatus for power generation and distribution according to various aspects of the present invention may operate in conjunction with a control system for controlling electrical power flowing between a main electrical grid providing main electrical grid power having a frequency, a supplemental power system, and a load. The control system may operate in conjunction with a switch system, wherein the switch system selectively connects the supplemental power system to the main electrical grid. A controller may be responsive to the main electrical grid power frequency and control the switch system. The controller may compare the main electrical grid power frequency to a first threshold and autonomously cause the switch system to connect the supplemental power system to the main electrical grid in response to the frequency of the main electrical grid power crossing the first threshold.

23 Claims, 11 Drawing Sheets

Related U.S. Application Data

(60) Provisional application No. 62/628,852, filed on Feb. 9, 2018, provisional application No. 62/534,544, filed on Jul. 19, 2017.

(51) Int. Cl.
- *H02J 3/14* (2006.01)
- *G05F 1/66* (2006.01)
- *H02J 3/32* (2006.01)
- *H02J 3/48* (2006.01)

(52) U.S. Cl.
CPC ............... *H02J 3/383* (2013.01); *H02J 3/48* (2013.01); *G05B 2219/2639* (2013.01)

(58) Field of Classification Search
USPC ........................................................ 307/44, 65
See application file for complete search history.

(56) References Cited

U.S. PATENT DOCUMENTS

| | | |
|---|---|---|
| 2012/0215368 A1 | 8/2012 | Sharma |
| 2014/0097683 A1* | 4/2014 | Piyabongkarn ........... H02J 3/32 307/26 |
| 2014/0218985 A1 | 8/2014 | Yu et al. |
| 2014/0249686 A1* | 9/2014 | Brainard ................... H02J 3/40 700/286 |
| 2015/0295581 A1* | 10/2015 | Shi ............................ H02J 3/40 700/287 |
| 2015/0338868 A1* | 11/2015 | Takaguchi ................ G05F 1/66 307/126 |
| 2016/0013652 A1* | 1/2016 | Li ............................. H02J 3/32 307/24 |
| 2016/0204611 A1 | 7/2016 | Chambon |
| 2018/0109112 A1 | 4/2018 | Paine et al. |
| 2018/0109162 A1 | 4/2018 | Paine et al. |
| 2018/0109163 A1 | 4/2018 | Paine et al. |
| 2019/0334352 A1* | 10/2019 | Sugimoto ................. H02J 3/46 |

* cited by examiner

METHODS AND APPARATUS FOR POWER GENERATION AND DISTRIBUTION

CROSS-REFERENCE TO RELATED APPLICATION

This application claims the benefit of U.S. Provisional Patent Application No. 62/628,852, filed Feb. 9, 2018, and is a continuation-in-part of U.S. patent application Ser. No. 16/040,257, filed Jul. 19, 2018, which claims the benefit of U.S. Provisional Patent Application No. 62/534,544, filed Jul. 19, 2017, and incorporates the disclosure of each such application by reference.

BACKGROUND

In electricity generation and distribution systems, when a generation resource fails or a load increases, the remaining generators may slow down. Spinning reserve generators provide generating capacity to meet demand in the event power generation or distribution is disrupted. The reserve typically comprises spinning reserve that is under-loaded or not connected to the system but available to be brought online. Spinning reserve generators often require ten minutes or more to reach required output levels, and many power system guidelines require a significant fraction of their operating reserve to come from spinning reserve. Operating spinning reserve increases costs and emissions.

SUMMARY OF THE INVENTION

Methods and apparatus for power generation and distribution according to various aspects of the present invention may operate in conjunction with a control system for controlling electrical power flowing between a main electrical grid providing main electrical grid power having a frequency, a supplemental power system, and a load. The control system may operate in conjunction with a switch system, wherein the switch system selectively connects the supplemental power system to the main electrical grid. A controller may be responsive to the main electrical grid power frequency and control the switch system. The controller may compare the main electrical grid power frequency to a first threshold and autonomously cause the switch system to connect the supplemental power system to the main electrical grid in response to the frequency of the main electrical grid power crossing the first threshold.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

Various aspects of the present invention may be described in terms of functional block components and various processing steps. Such functional blocks may be realized by any number of hardware or software components configured to perform the specified functions and achieve the various results. For example, exemplary embodiments of the present invention may employ various power distribution systems, power supplies, energy storage systems, control systems, protection systems, sensors, switch systems, relays, and the like, which may carry out a variety of functions. In addition, various aspects of the present invention may be practiced in conjunction with any number of power generation, distribution, and supply environments, and the systems and methods described are merely exemplary applications for the invention. Further, exemplary embodiments of the present invention may employ any number of conventional techniques for generating power, monitoring power, controlling supplemental power, and the like.

Figure 1:
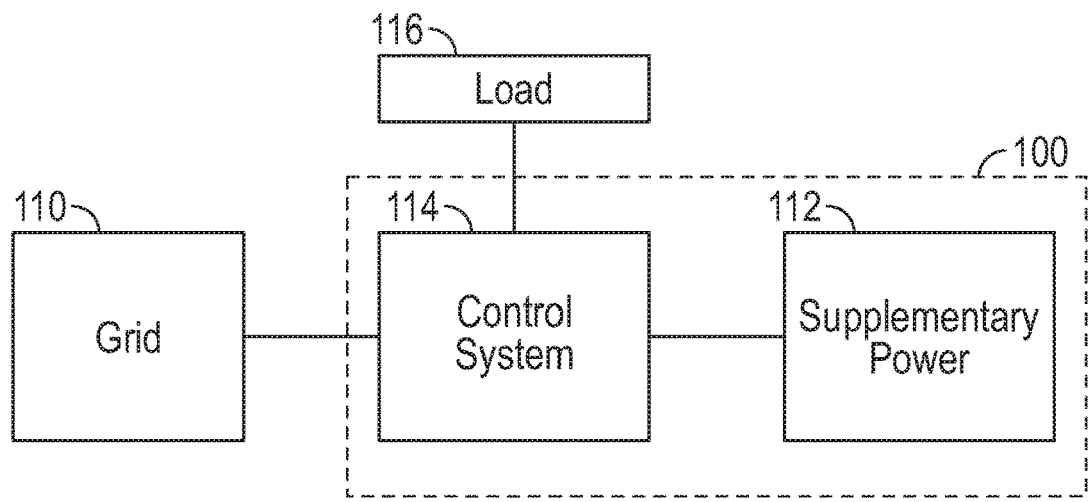
FIG. 1 is a block diagram representatively illustrating a system and methods for power distribution according to various aspects of the present invention.

Various representative implementations of the present invention may be applied to any suitable system for distributing power and/or providing power to a load. Certain representative implementations may include, for example, a conventional power supply grid and a supplemental power supply comprising one or more power supply resources. Referring to FIG. 1, methods and apparatus for supplying power according to various aspects of the present invention may comprise a power supply system 100 operating in conjunction with a main electrical grid 110 or other supply for an electrical load 116, a supplemental power supply 112, and a control system 114. The control system 114 monitors the main electrical grid's 110 power quality and, in the event the power quality deviates from selected parameters or characteristics, autonomously connects the supplemental power supply 112 to the main electrical grid 110 to provide power to the main electrical grid 110. The control system 114 may also monitor the electrical grid 110 for outages and/or defects and activate the supplemental power supply 112 to provide power to a facility, such as a facility including the electrical load 116.

The main electrical grid 110 comprises a main source of power supply during normal operation, such as the conventional electrical grid. In one embodiment, the electrical grid 110 comprises a network of power plants and transformers connected by high-voltage transmission lines that transfer electric power generated at power plants to switchyards and substations, as well as a local distribution system of smaller, lower-voltage transmission lines that moves power from the substations to users. In the present embodiment, the main electrical grid 110 comprises the existing and established network commonly referred to as "the grid" for distributing electrical power to users. The main electrical grid 110 may deliver power according to standard specifications, such as power at 120 VAC, single phase, 60 Hz, or other appropriate specifications, and may supply power via a single feed or multiple feeds. Methods and apparatus according to various aspects of the present invention may be applied to other environments, however, such as to another source of electrical power, a particular load 116, or electrical supply/distribution system.

The electrical load 116 consumes electricity. The electrical load 116 may comprise any suitable electrical components or other circuit elements that consume reactive and active electric power, such as electronics, appliances, environmental control systems, and lights. Multiple electrical power consuming elements may collectively make up the load 116.

In the present embodiment, the load 116 may be a conventional microgrid load, such as multiple discrete load elements in a particular geographic area like a campus, military installation, or institution. The load elements comprise the systems that consume electricity, such as lighting, heating, cooling, computer systems, appliances, communications equipment, and the like.

The load 116 may include high priority or critical elements that constitute a critical load. The critical load may constitute elements associated with important functions that need continuous and reliable power, such as hospitals, government offices, fire stations, and police stations and their corresponding electrical systems.

The supplemental power supply 112 selectively provides supplemental power to the grid 110 and/or the load 116. The supplemental power supply 112 may comprise any suitable system for generating and providing power to the grid 110, such as one or more large generators, small generators, energy storage systems, photovoltaic solar arrays, and/or other power supply systems. In one embodiment, the supplemental power supply 112 may comprise one or more spinning partially-loaded reserve generators to selectively inject active power to the grid 110 substantially immediately. In an alternative embodiment, the supplemental power supply 112 may instead or additionally comprise a spinning and/or non-spinning, fast start generating system, such as a non-spinning system that can start from a stopped state and get to full power within a designated time, such as 20, 30, or 35 seconds, or immediately if coupled with a ride-through battery system. The supplemental power supply 112 may also or alternatively include other power sources, such as photovoltaic sources, wind-driven sources, or energy storage systems, such as batteries and flywheels.

For example, referring to FIG. 1, in an exemplary embodiment, the supplemental power supply 112 comprises a microgrid 310, such as a customer-owned (as opposed to utility-owned) local energy grid with control capability to disconnect from the main electrical grid 110 and operate autonomously while disconnected from the main electrical grid 110. The microgrid 310 may comprise a power supply system using distributed energy resources (including, for example, demand management, solar panels, storage, and generation) and loads capable of operating in parallel with, or independently from, the main electrical grid 110. The microgrid 310 can operate while connected to the grid 110 to supply power to the main electrical grid 110, but can also isolate itself from the main electrical grid 110 and use local energy generation to supply particular users, such as in times of crisis like storms or power outages. The microgrid 310 comprises a group of interconnected loads and distributed energy resources within clearly defined electrical boundaries that act as a single controllable entity. The microgrid 310 is capable of serving one or more customers and can connect and disconnect from the main electrical grid 110 to enable it to operate in either grid-connected mode or island mode. The microgrid 310 may be configured to operate as a virtual power plant, where multiple microgrids respond to grid-wide events substantially in unison.

The microgrid 310 may comprise any suitable elements for providing power, such as distributed generators, energy storage systems like batteries, flywheels, and/or electrochemical capacitors, and/or renewable resources like solar panels. The microgrid 310 may comprise conventional generating equipment, such as generators using diesel engines or other prime movers. For example, the microgrid 310 may comprise 25 MW Standby/20 MW Prime rated diesel AC generators 312, or other appropriate size and/or rating, with the capability to selectively operate in either island mode to support a local user group in the event of a main electrical grid 110 outage or in grid-connected mode, for example to facilitate transferring power to the grid 110, for example for peak shaving and frequency response events. The microgrid 310 may also include other distributed energy resources, such as photovoltaic solar panels and battery storage.

The microgrid 310 may operate substantially continuously or selectively depending upon the status of the grid and connected loads. The microgrid 310 may also comprise various other elements for operation, such as SCADA equipment, breakers, transformers, switchgear, grounding systems, fuel supply and storage systems, emissions controls, environmental controls, safety equipment, and/or redundant systems and components to improve reliability.

Figure 2:
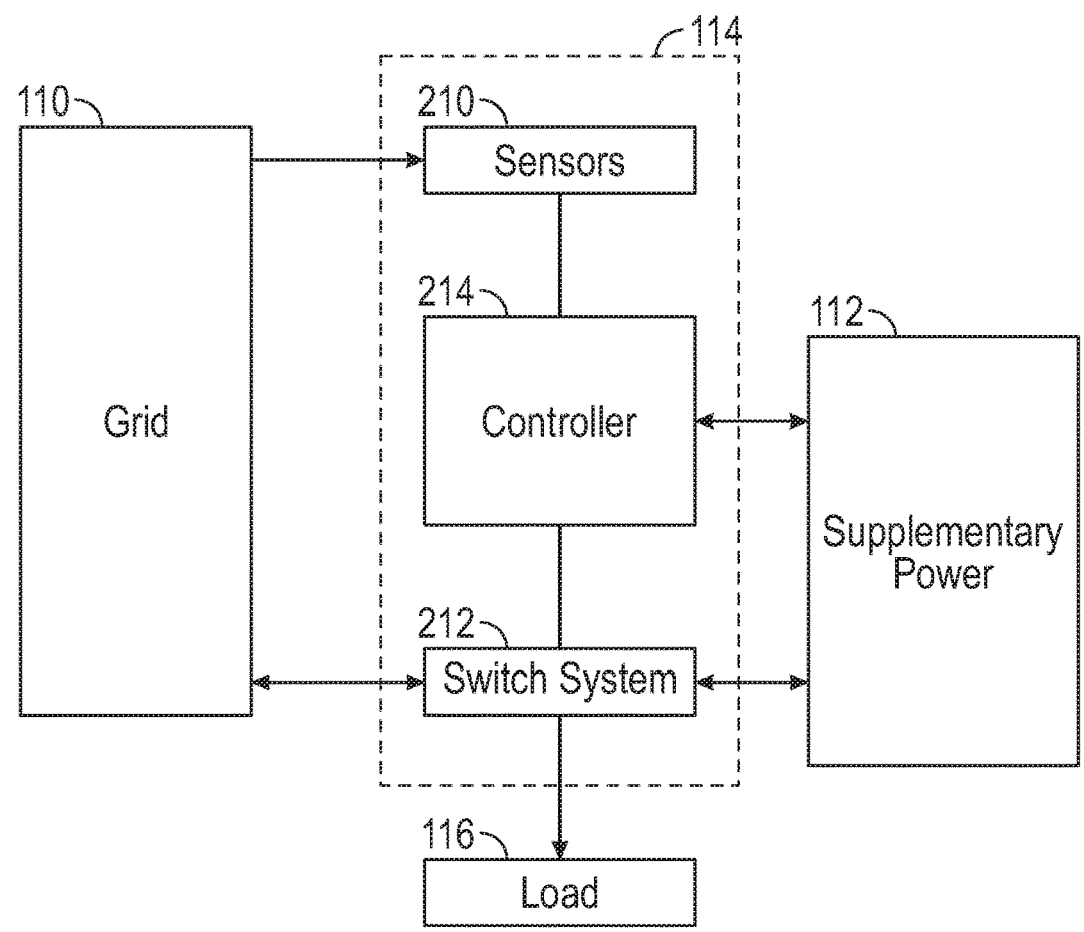
FIG. 2 is a block diagram representatively illustrating a system and methods for power distribution according to various aspects of the present invention.

In one embodiment, the microgrid 310 comprises the supplemental power supply 112, wherein the supplemental power supply 112 is adapted to selectively provide power to the load 116. Referring to FIG. 2, the microgrid 310 may also comprise the control system 114, which may comprise a sensor 210 responsive to the frequency of the main electrical grid 110 power and generating a signal corresponding to the frequency of the main electrical grid 110 power; a switch system 212, wherein the switch system 212 selectively connects the supplemental power supply 112 to the main electrical grid 110; and a controller 214 responsive to the sensor 210 and controlling the switch system 212, wherein the controller 214 automatically compares the frequency of the main electrical grid 110 power to a first threshold and automatically causes the switch system 212 to synchronize and connect the supplemental power supply 112 to the main electrical grid 110 in response to the frequency of the main electrical grid 110 power crossing the first threshold. The first threshold may be between 59 and 60 Hz, such as between 59.9 and 60 Hz, and the controller 214 may automatically cause the switch system 212 to connect the supplemental power supply 112 to the main electrical grid 110 only if the frequency of the electrical power from the main electrical grid 110 crosses the first threshold and remains across the first threshold for at least a pre-selected duration, such as at least two seconds.

The controller 214 may automatically compare the frequency of the electrical power from the main electrical grid 110 to a second threshold, and automatically reduce power from the microgrid 310 to the main electrical grid 110 if the frequency of the electrical power from the main electrical grid 110 crosses the second threshold. The controller 214 may further automatically and repeatedly reduce power from the microgrid 310 to the main electrical grid 110 if the frequency of the electrical power from the main electrical grid 110 remains across the second threshold for a selected duration, such as at least five minutes. The controller 214 may increase power from the microgrid 310 to the main electrical grid 110 if the frequency of the electrical power from the main electrical grid 110 does not remain across the second threshold for the selected duration.

In various embodiments, the supplemental power supply 112 comprises a plurality of stopped generators, and the controller 214 may automatically cause the switch system 212 to connect the generators to the main electrical grid 110 after starting the plurality of stopped generators and waiting a ramp-up time for the generators (i.e., time to supplying full rated capacity). The ramp-up time may be less than 20 seconds. The supplemental power supply 112 may comprise a DC source, and the controller 214 may automatically cause the switch system 212 to connect the DC source to the main electrical grid 110 within one second or less after the frequency of the electrical power from the main electrical grid 110 crosses the first threshold and for the duration of the ramp-up time.

Figure 6:
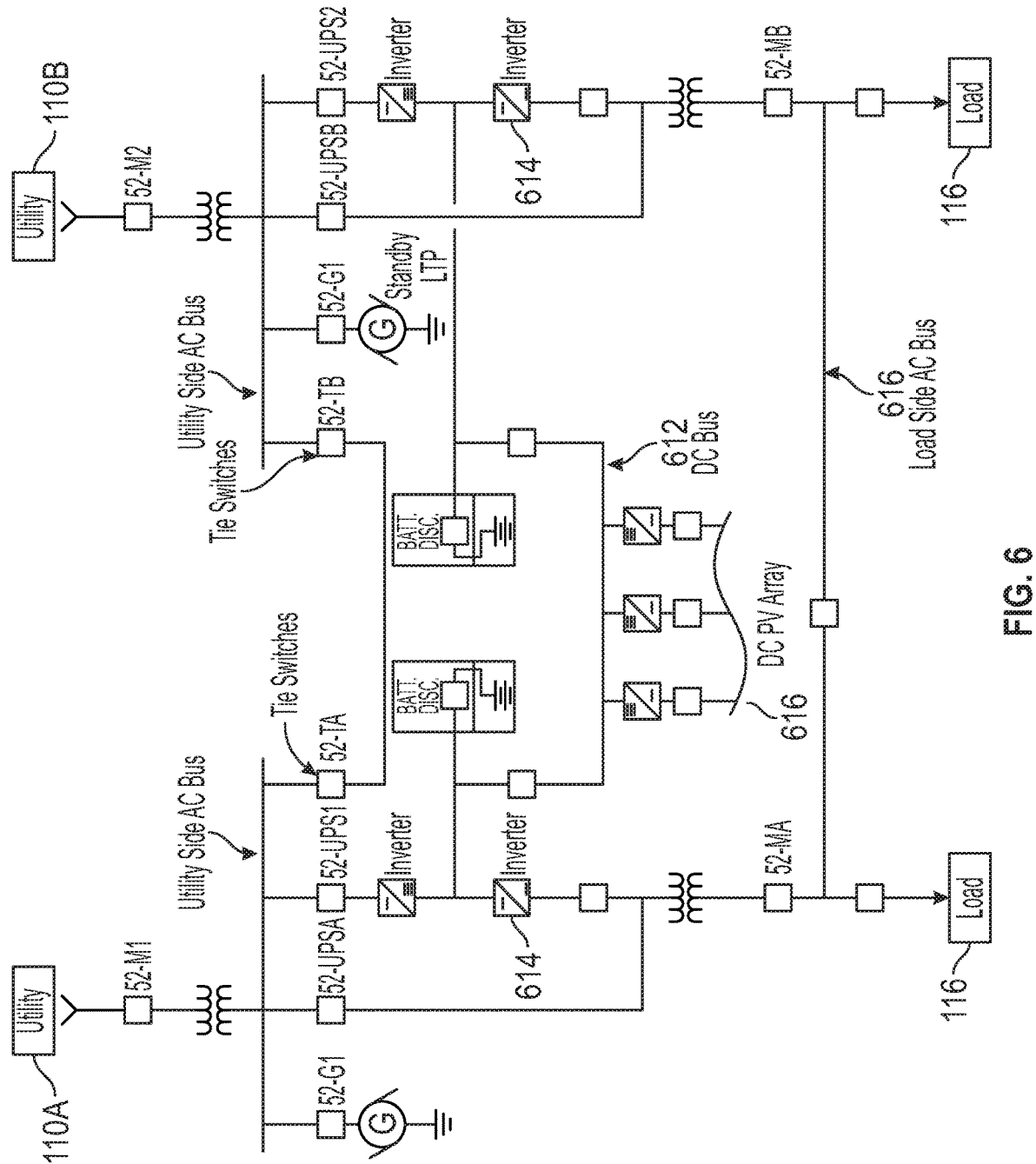
FIG. 6 is a diagram of a power distribution system with two utility feeds and two loads.

In various embodiments, referring to FIG. 6, the supplemental power supply 112 may alternatively or additionally include DC power resources 610, such as batteries, DC energy storage systems, or photovoltaic systems. The various DC power resources 610 may be connected to the other elements of the system 100 in any suitable manner. In one embodiment, one or more of the DC power resources 610, or all of the DC power resources 610, may be connected to a common DC bus 612. The common DC bus 612 may be connected to one or more inverters 614 to convert the DC power to AC power.

The common DC bus 612 facilitates connection of multiple DC power sources 610 to the load 116, the main electrical grid 110, and/or the other elements of the supplemental power supply 112. The common DC bus 612 may facilitate providing power to the load 116 as well as receiving power, such as to charge batteries or other energy storage systems.

In various embodiments, the microgrid 310 may comprise a group of interconnected distributed energy resources (DERs) with clearly defined electrical boundaries that acts as a single controllable entity with respect to the main electrical grid 110 and can connect and disconnect from the main electrical grid 110 to enable it to operate in both grid-connected or island mode. The microgrid 310 may operate while connected to the main electrical grid 110, but can enter island mode and operate on its own using local energy generation, such as to supply power to the load 116 in the event of a main electrical grid 110 outage.

In parallel (or "grid-connected") mode, the microgrid 310 is connected to the main electrical grid 110, for example to supplement or replace power received from the main electrical grid 110 and provided to the load 116, and/or to facilitate transferring power to the grid 110, such as for peak shaving and frequency response events. The microgrid 310 may be capable of providing power to the main electrical grid 110 in response to power quality events, peak demand events, and/or frequency upset events. The microgrid 310 may have the capability to operate in various other modes.

The microgrid 310 may include electrical provisions to interconnect it physically with the main electrical grid 110 and the load 116, as well as connections for other power sources such as photovoltaic arrays and energy storage systems. For example, the microgrid 310 may include equipment and materials to generate electrical power and to interconnect with existing distribution-level substations of the main electrical grid 110 and/or the load 116. The various elements of the microgrid 310, including the generators, transformers, and switchgear, may be selected and configured so as not to limit generator output power.

The microgrid 310 may also include protective elements, such as circuit breakers for de-energization and isolation of equipment in the event of electrical faults. Protective elements may be coordinated between the microgrid 310 elements, such as the engine generators and switchgear, and substations connected to the main electrical grid 110.

Figure 3:
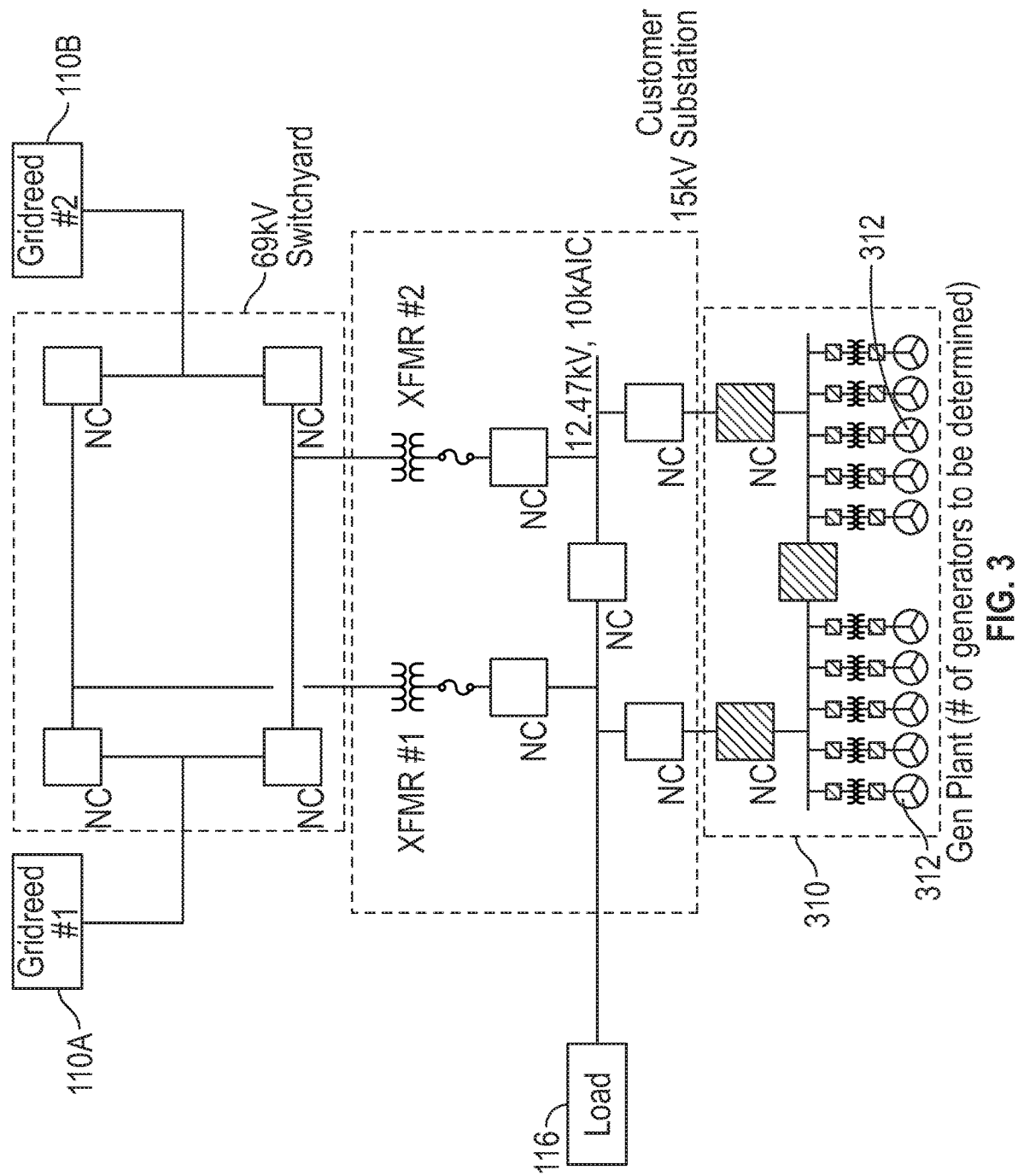
FIG. 3 is a schematic diagram representatively illustrating a system and methods for power distribution according to various aspects of the present invention including a microgrid.

Referring to FIG. 3, in an exemplary embodiment, the microgrid 310 comprises multiple identical generator sets collectively capable of generating the specified power requirements. For example, the nominal output of the microgrid 310 with all generator sets operating at 100 percent capacity may be the desired power output of the microgrid 310, such as approximately 25 MW Standby rating, 21.6 MW Prime rating under selected conditions. The generator sets may also be selected to meet any other appropriate criteria, such as EPA emissions performance, and may comprise any suitable type of generator, such as permanent magnet type generators.

The microgrid 310 power sources may be connected to switchgear. The power sources may be capable of auto-synchronizing to the load 116 electrical system and the main electrical grid 110, including during a dead bus or parallel conditions. The power sources may include protective relaying, such as integral molded-case circuit breakers and both local and remote annunciators for alarm and shutdown indication, as well as communication connections allowing for remote monitoring and/or control.

Figure 5:
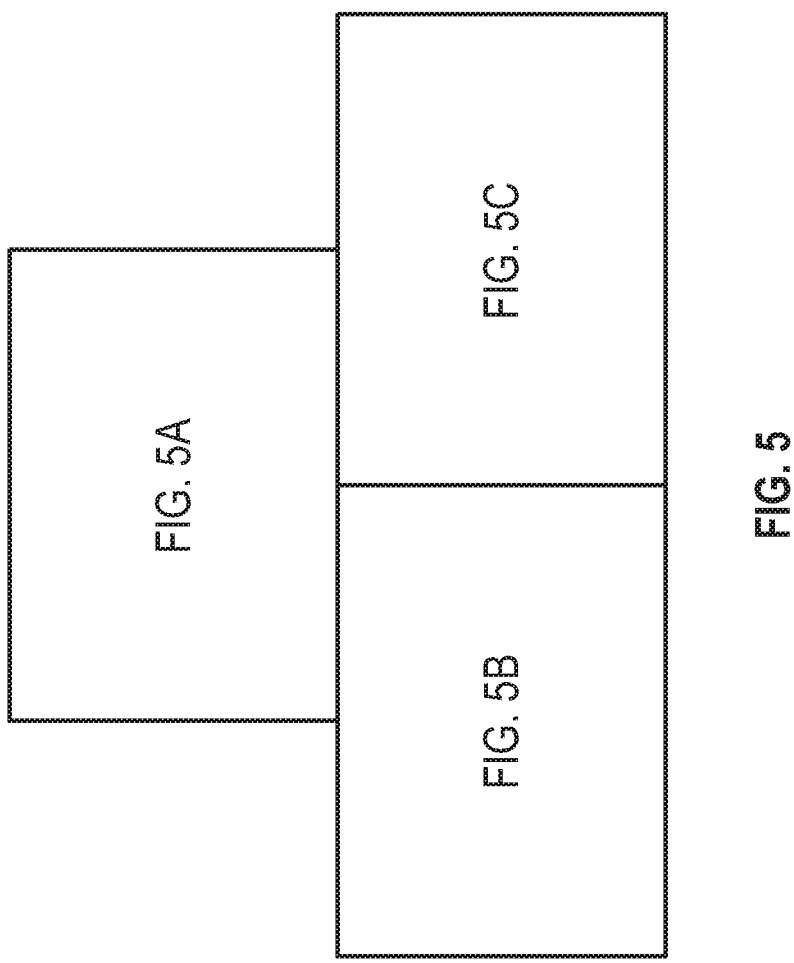
FIGS. 5-5C are schematic diagrams of a power distribution system with multiple power blocks of multiple generators and multiple switch gear elements.
Figure 5A:
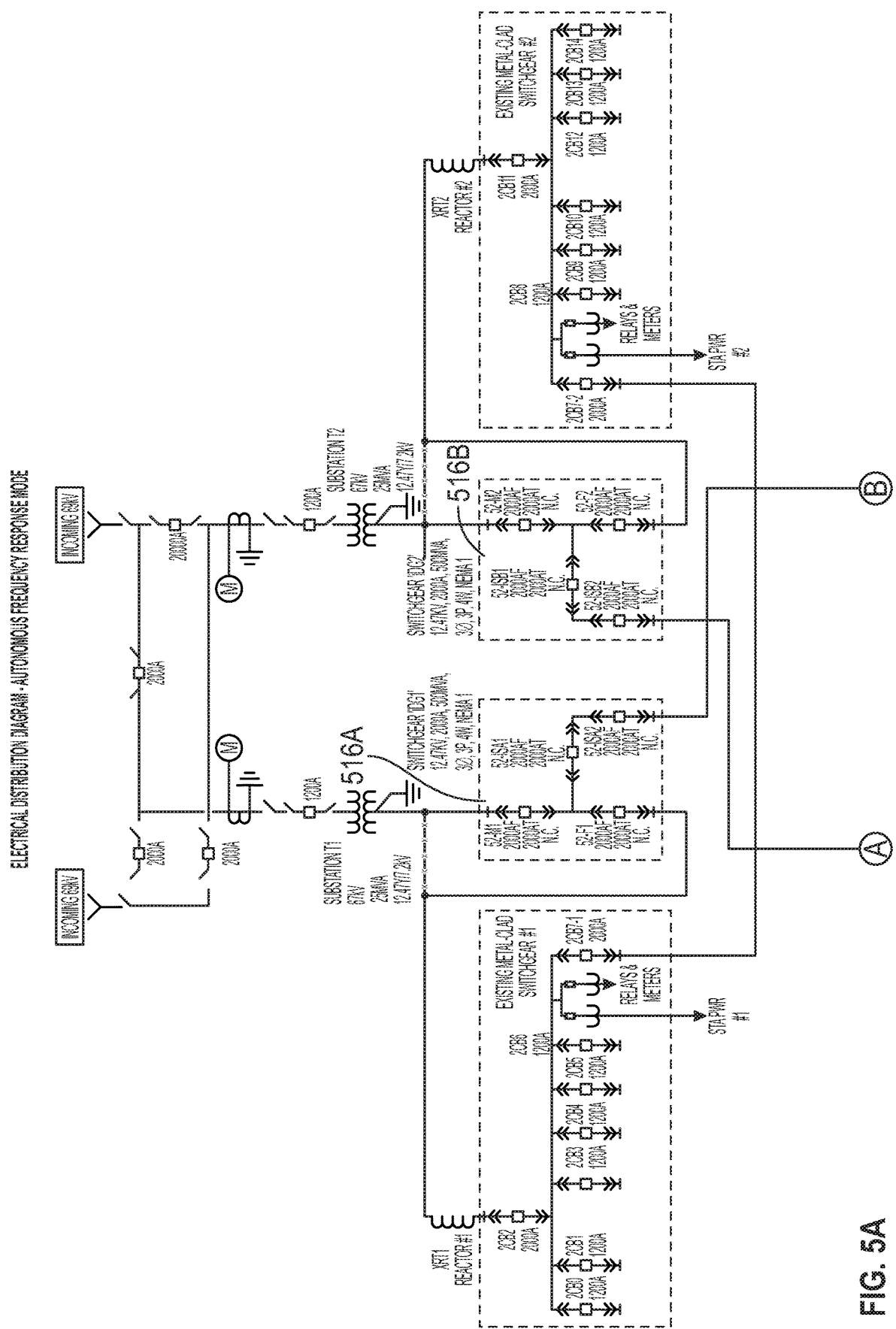
Figure 5B:
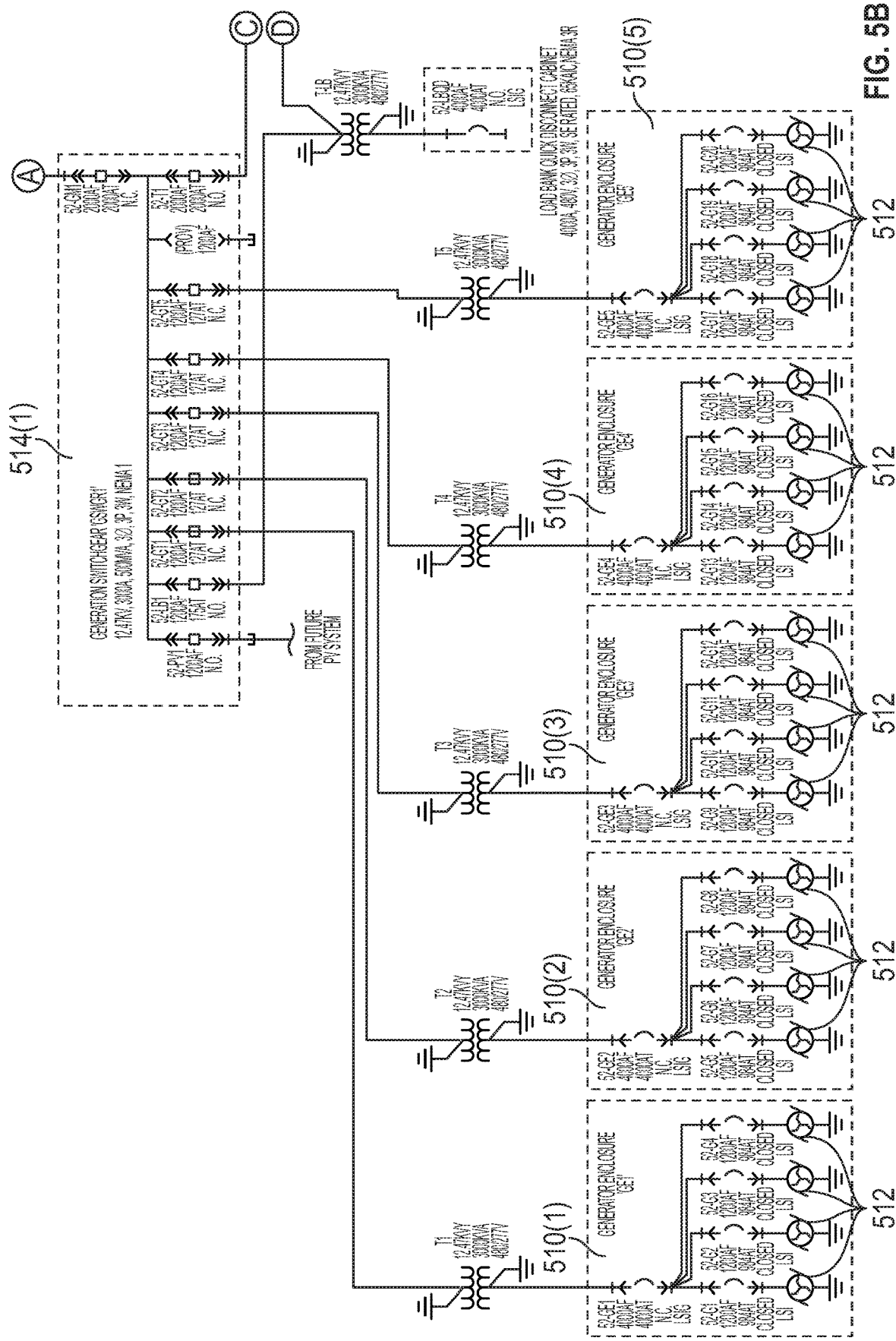
Figure 5C:
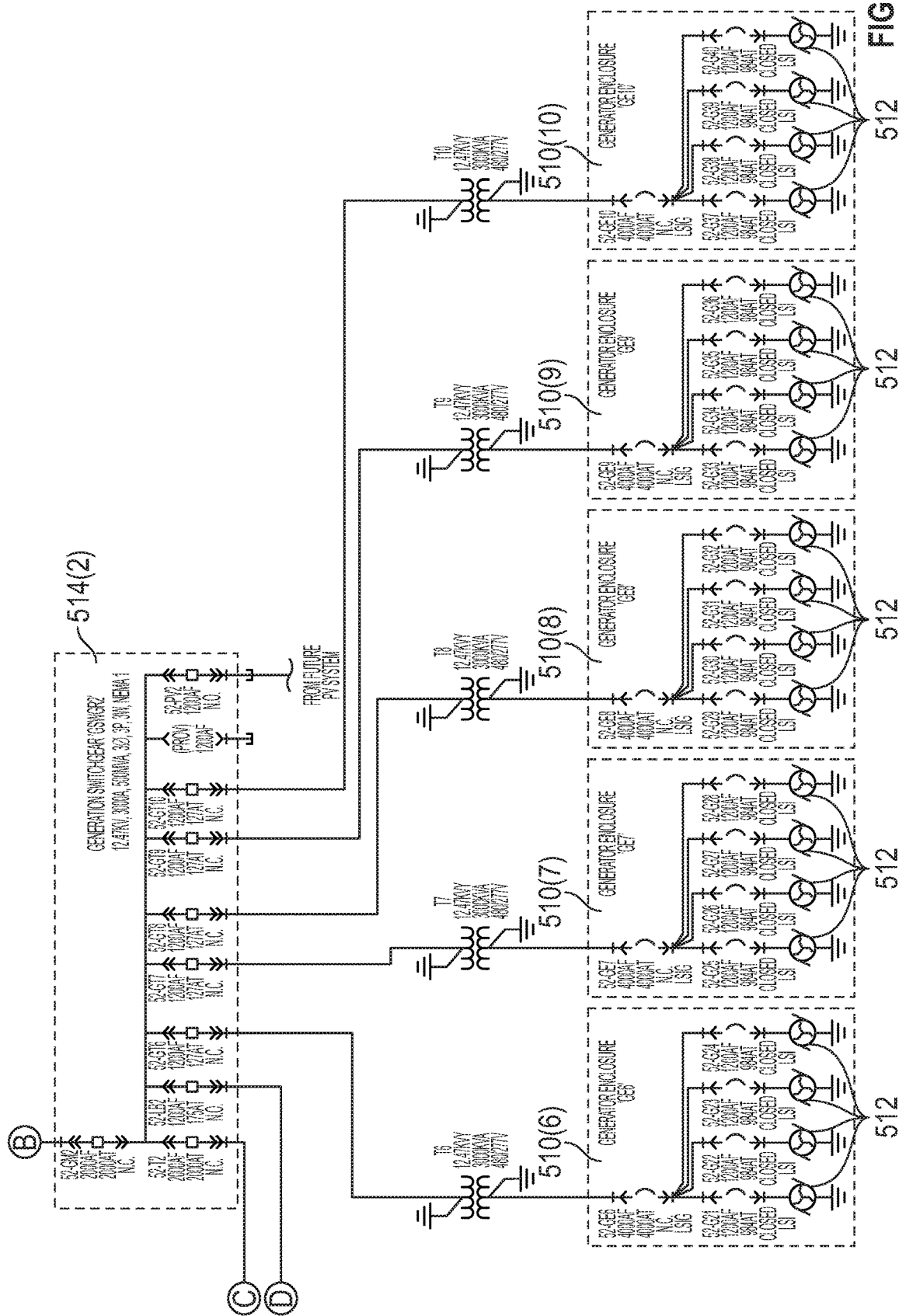

In one embodiment, the microgrid 310 may include multiple blocks of generators, and each block of generators may comprise multiple generators. For example, referring to FIGS. 5-5C, the microgrid may include multiple (such as 10) generator enclosures 510 connected in parallel via the switch gear 514, and each generator enclosure may include four generators 512 connected in parallel.

Referring again to FIG. 1, the control system 114 monitors the electrical grid's 110 power quality. The control system 114 may selectively connect and disconnect the main electrical grid 110 from the load 116 and the supplemental power supply 112 to and from the main electrical grid 110 and the load 116. For example, in the event the power quality from the main electrical grid 110 deviates from selected parameters or characteristics, the control system 114 may autonomously connect the supplemental power supply 112 to the electrical grid 110.

The control system 114 may monitor various parameters actively, such as by continuously or intermittently sensing parameters and checking the progress or quality of a variable over a period of time or otherwise keeping the variable under systematic review, or relatively passively, such as by responding to trigger signals, additional loads, or other data provided to the control system 114. The control system 114 may also control the supplemental power supply 112 according to other criteria, such as to meet air emission/licensing requirements, e.g. EPA emission requirements.

The control system 114 may comprise any appropriate systems, elements, and characteristics, for example to monitor relevant parameters of the power provided by the main electrical grid 110 and selectively connect the supplemental power supply 112, the main electrical grid 110, and the load 116. For example, referring to FIG. 2, the control system 114 may comprise one or more sensors 210 to sense a characteristic of the power provided by the main electrical grid 110, the switch system 212 to selectively connect the supplemental power supply 112, the main electrical grid 110, and the load 116, and the controller 214 to respond to the sensor 210 and control the switch system 212.

In one embodiment, the control system 114 monitors the frequency or other power quality aspect of the electrical signal on the main electrical grid 110. If the control system 114 detects a frequency variation over a threshold, such as pre-programmed set points, or other deviation from a target, the control system 114 may respond to address the variation, such as by supplying power from the supplemental power supply 112 to the main electrical grid 110.

In one embodiment, the control system 114 implements Autonomous Frequency Response (AFR), which allows the supplemental power supply 112 to autonomously activate and/or connect to the main electrical grid 110 based on a frequency characteristic deviating from a desired condition, and provide energy to the main electrical grid 110 for the purpose of mitigating a frequency event within a specified time frame, such as a time limit outlined by standards of NERC, WECC, FERC, and/or a Regional Transmission Organization (RTO) or Balancing Authority (BA). The AFR function provided by the control system 114 allows a very fast response, which can be counted as responsive to both primary and secondary frequency response during a frequency event without using a running generator, thus saving on fuel, maintenance, and emissions.

Figure 7A:
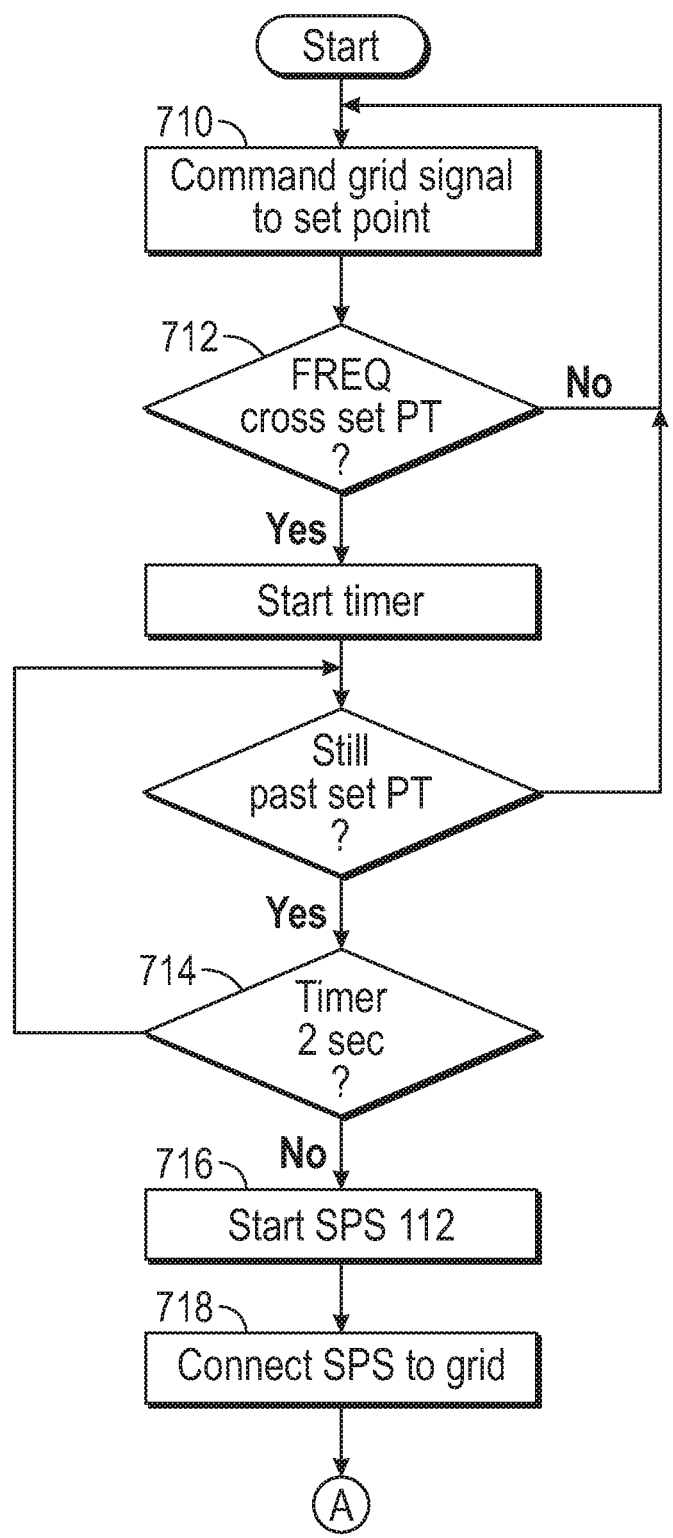
FIGS. 7A-C represent a process for controlling a supplemental power supply.
Figure 7B:
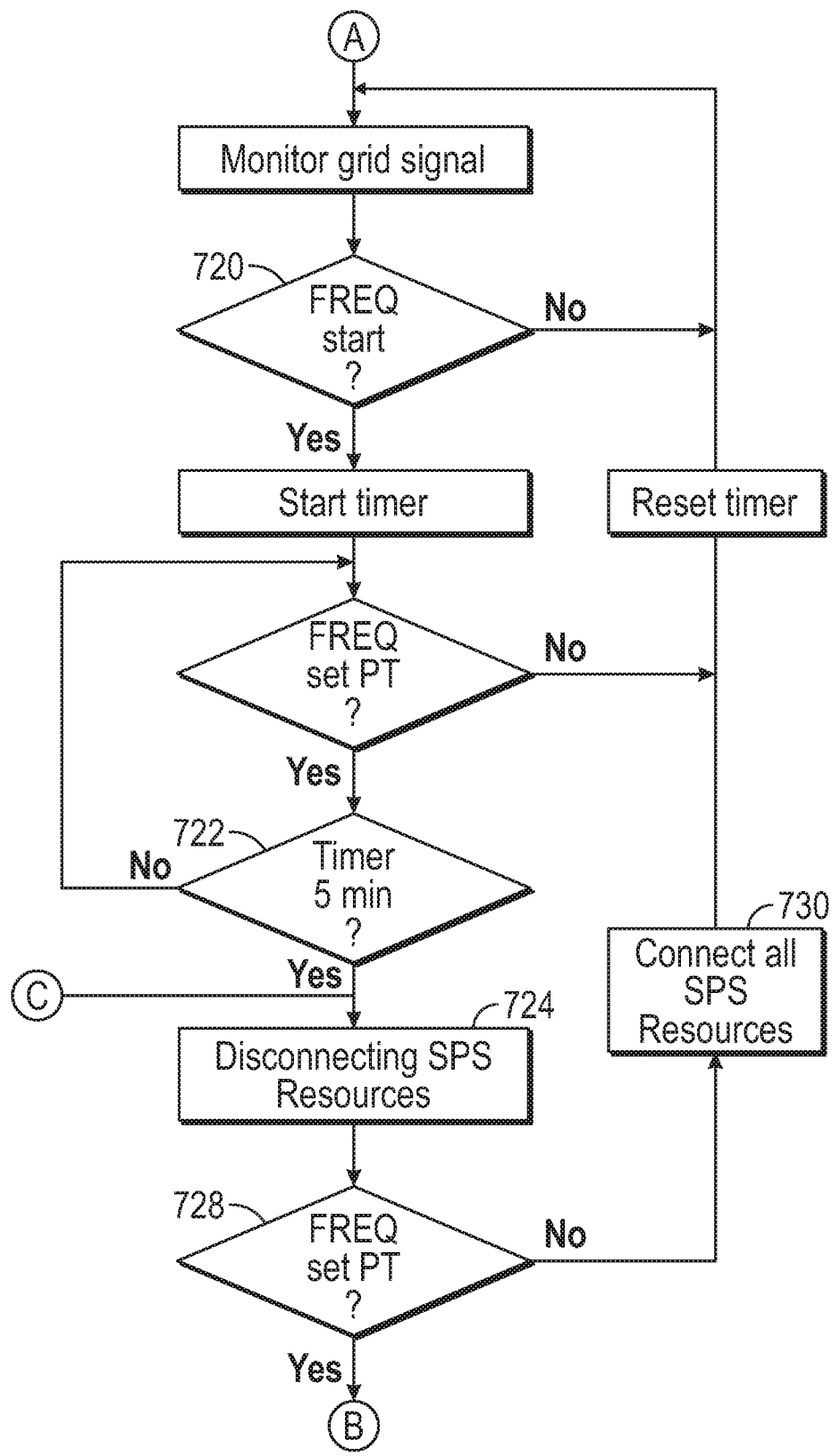
Figure 7C:
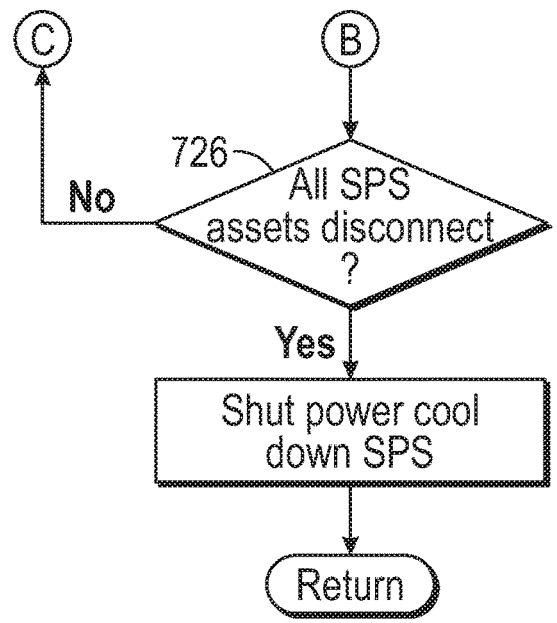

In one exemplary embodiment, referring to FIGS. 7A-C, the control system 114 automatically and substantially continuously monitors the electricity provided by the main electrical grid 110, such as for deviations in power quality, including but not limited to frequency events beyond programmed set points (710). When the control system 114 detects a grid frequency at or below the frequency set point (712) for a particular duration, such as two seconds or more (714), the control system 114 starts the supplemental power supply 112 (716), if necessary, and connects the supplemental power supply 112 to the main electrical grid 110 (718). For example, the control system 114 may start all available generators in the supplemental power supply 112, ramp them to synchronous speed, parallel connect them to the main electrical grid 110, and load inertial energy from the generators onto the main electrical grid 110 until grid frequency returns to a programmed set point (720) for a selected duration, such as five minutes (722).

After five minutes or other time period of grid frequency stability, the control system 114 may start disconnecting elements of the supplemental power supply 112 from the main electrical grid 110 (724) until all frequency mitigation generation is removed from the main electrical grid 110 (726). If another frequency event is detected during the generation removal process (728), the control system 114 may return the frequency mitigation generation to the main electrical grid 110 (730) and mitigate the next event until the main electrical grid 110 returns to a target frequency for a selected period, such as five minutes or more, at which time the control system 114 resumes the shutdown process.

By monitoring the electricity provided by the main electrical grid 110 and responding with resources from the supplemental power supply 112, such as the microgrid 310, the control system 114 can produce power within a selected time, such as 20 seconds, upon detection of a frequency event. This eliminates the need for spinning reserve generators, which likewise eliminates fuel consumption while in standby, emissions while in standby, and generator degradation while in standby while still maintaining main electrical grid 110 reliability.

In an embodiment including faster-response resources, such as DC power generation sources like batteries, the control system 114 may utilize the faster-response resources to respond to power quality events more quickly. For example, in the event of a frequency event, the control system 114 may immediately connect the DC power generation sources to the main electrical grid 110 via an inverter and synchronize the signal. Because the DC power generation sources may require a very short activation time, they can be used to respond quickly while spinning resources ramp up. This may be especially useful to provide power to critical loads.

In the event of an overvoltage situation, the control system 114 may "island" the load 116, for example if the overvoltage gets above a programmed set point. Alternatively or additionally, some DC power generation resources may be connected to create extra load and receive excess power. For example, batteries, flywheels, and other energy storage systems may be connected via an inverter to charge with any excess power provided by the main electrical grid 110 or the supplemental power supply 112. Similarly, the DC power generation resources may be connected to the main electrical grid 110 or supplemental power supply 112 in the event of an overfrequency event, i.e., the frequency of the power signal is higher that the target frequency for a selected period of time. In various embodiments, the DC power generation resources may be continually connected to the AC bus, which allows sub-cycle injection of AC power into the load 116 during a power quality event.

In some embodiments, the DC power generation resources may be sufficiently sized to replace spinning or other AC resources altogether. The DC power generation resources may provide enough power to supply the load or necessary elements of the load, such as critical loads. This configuration may be especially useful under comparatively stringent air quality limitations or response requirements.

In various embodiments, the control system may connect and disconnect supplemental power supply 112 resources to and from the main electrical grid 110 according to other criteria, such as to increase or decrease the main electrical grid's 110 power signal frequency to keep it within a desired range and to support the electrical load 116. For example, if the frequency drops too low, the control system 114 may connect power generation resources of the supplemental power supply 112 to the main electrical grid 110. If the frequency drops below a threshold, such as 59.5 Hz (81 U), the control system 114 may disconnect the supplemental power supply 112 and the electrical load 116 from the main electrical grid 110 and configure the supplemental power supply 112 to supply power to the electrical load 116. In conventional power distribution systems, a frequency dropping to 59.5 Hz indicates potential large scale power outages.

Conversely, if the frequency rises too high, the control system 114 may connect energy storage resources of the supplemental power supply 112, such as batteries, to the main electrical grid 110. If the frequency rises below a threshold, such as 60.5 Hz (81 O), the control system 114 may disconnect the supplemental power supply 112 and the electrical load 116 from the main electrical grid 110 and configure the supplemental power supply 112 to supply power to the electrical load 116. In conventional power distribution systems, a frequency rising to 60.5 Hz indicates potential large scale power outages.

The control system 114 may be implemented in any suitable manner. In the present embodiment, the control system 114 comprises an integrated microgrid controller comprising instruments, control devices, programmable logic controllers (PLCs), and interconnections, and interfaces to control, monitor, alarm, protect, interlock, diagnose, maintain, and safely operate the microgrid 310. The integrated microgrid control system may perform modulating and discrete control, equipment protection and process interlocking, component diagnostic, unit/process upset analysis, maintenance guidance, and data archiving to meet operational conditions, assuring safe, environmentally compliant, and economic operation of the facility.

The process monitoring and management functions of the control system 114 may be highly centralized, such as via the engine manufacturer's operator interface stations. Control, protection, and interlock functions may be distributed to individual microprocessors or programmable controllers. Interface equipment between the control system 114 and the control and instrumentation packages and other equipment may integrate areas into the engine manufacturer's control scheme, such as via hardwired I/O points to enable centralized control from a control room. The control system 114 may be implemented for high reliability, including redundant process control elements for critical systems, to enable automated operation.

The control system 114 may be compatible with criteria provided by a manufacturer of a particular power source of the supplemental power supply 112, for example such that no single fault causes the complete failure of any system, or causes any engine/generator protection system to malfunction or anti-action. Process control element redundancy may be provided for all parameters that may directly cause a unit safeguards function to activate. Redundancy in the control and operations structure may be implemented so that no single fault within an individual system can cause failure of the controlled equipment, or cause the standby equipment to be unavailable. In case of a failure of in-service equipment, the control system 114 may automatically start the supplemental power supply 112 without any system interference.

The control system 114 may comprise one or more central controllers, implemented as one or more CPUs or servers, and one or more decentralized programmable logic controllers (PLCs), CPUs, relays, and sensors. The control system 114 implements logic and operations to allow the controllers to register and analyze signals from PLCs, CPUs and distributed energy resources (DERs) to perform various functions, such as:

controlling and dispatching grid power and DER assets including but not limited to any prime mover, batteries, solar, Hydro, steam, flywheel, thermal, or kinetic motion energy saving or producing device.

reconfigure the microgrid and the interface to the main grid to reroute power around open circuits or faulted areas while still protecting the load and system.

communicate to other controllers, prime movers, DER assets as well as report all alarms, trends and history of all systems within and or outside a microgrid.

to predict maintenance of microgrid systems and or ancillary components.

can be controlled and monitored locally or remotely.

disconnect the microgrid from the main grid and continue to provide power to critical loads until grid power returns to stable and safe levels.

annunciate alarms and conditions of all resources within and or connected to the microgrid.

communicate and operate through a CANBUS system using a variety of industry standard protocols.

communicate through wireless networks as well as temporary and permanently wired, microwave or fiber networks.

may be configured with a backup Micro grid controller.

configured to work with and control AC or DC supply power.

can read critical fluid levels and alarm and react to all J1939 communication protocol systems.

control and dispatch load banks, temporary generators and other load and or load simulation equipment.

perform both open and closed transition with both AC and DC voltages.

control volt/var generation and distribution.

control and manage modes of operation including but not limited to:
1. Autonomous Frequency Response
2. Peak Shaving
3. Test Mode
4. Black Start
5. Intentional Islanding
6. Autonomous Reconfiguration The control system 114 may be monitored, supervised, and controlled from multiple sites, or via a central control room with local startup, operation, shutdown, and emergency shutdown capability for equipment. The control system 114 may also provide for remote control and access, such as via fiber optic connectivity. In the present embodiment, startup, normal operation, shutdown, upsets, and other operation conditions may be performed by a single operator in the control room or remotely via connection to the SCADA system.

The sensor 210 monitors one or more aspects of main electrical grid 110 and may comprise multiple sensors 210 for monitoring the same or different aspects of the main electrical grid 110. For example, referring to FIG. 4, the sensors 210 may include one or more frequency sensors 414 for monitoring the frequency of the power provided by the main electrical grid 110. The sensors 210 may also comprise one or more voltage and/or current sensors for monitoring the voltage and/or current of the power provided by the main electrical grid 110. The sensors 210 may monitor any desired characteristics of the main electrical grid 110, such as noise levels, current, and signal consistency.

The sensors 210 may be connected to the main electrical grid 110 at any point and in any appropriate manner, such as directly to transmission or distribution lines, or indirectly, such as by receiving data from an intermediary. In the present embodiment, the sensor 210 comprises one or more frequency sensors 414 directly connected to the main electrical grid 110 to monitor the frequency of the power provided by the main electrical grid 110.

Figure 4:
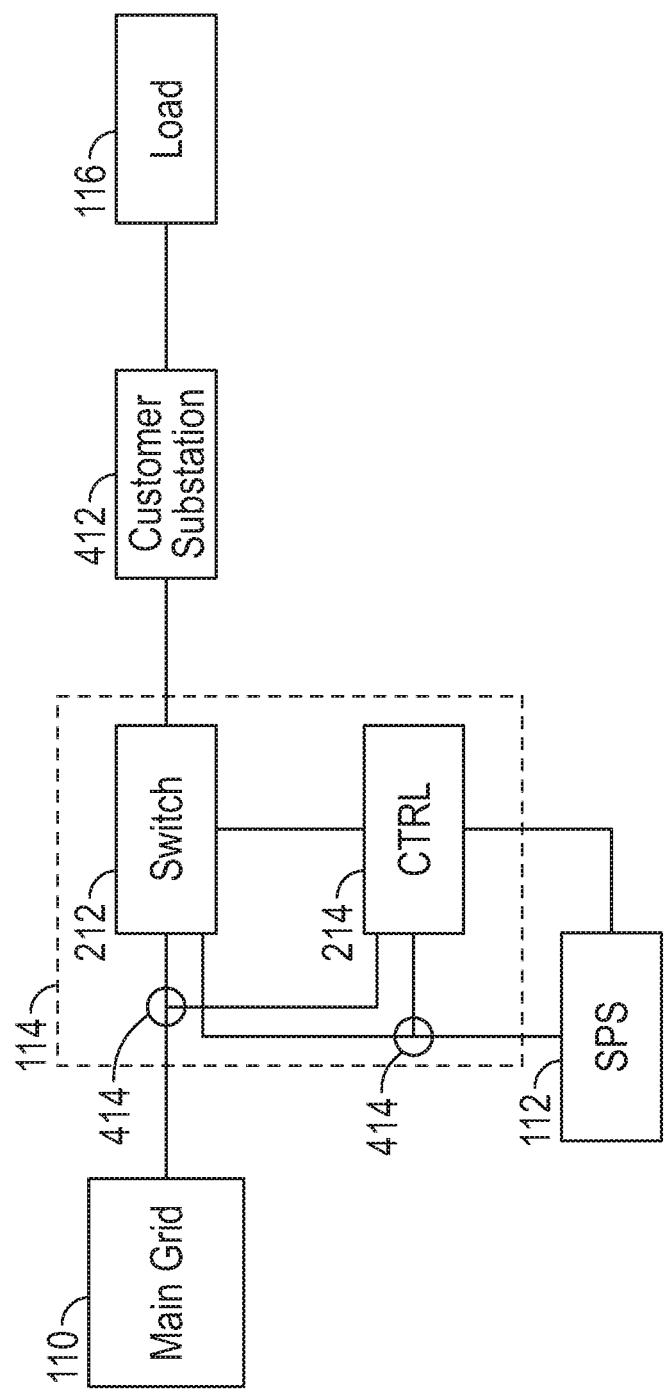
FIG. 4 is a block diagram representatively illustrating systems and methods for power distribution according to various aspects of the present invention.

For example, with continued reference to FIG. 4, the sensors 210 may comprise sensors adapted to sense conditions, such as electrical conditions of the main grid at a main grid substation 410 and of the customer power supply at a customer substation 412. The sensors 210 may comprise any suitable sensors, such as current transformer (CT) sensors to sense current characteristics, potential transformer (PT) sensors to sense voltage characteristics, and/or frequency sensors to sense frequency characteristics of the electricity.

Referring again to FIG. 2, the microgrid 310 may connect to the main electrical grid 110 via the switch system 212. The switch system 212 may connect the load 116 to the main electrical grid 110 unless a problem arises on the main electrical grid 110 or another reason to disconnect occurs.

The switch system 212 can disconnect the load from the main electrical grid 110 and connect the load 116 to the microgrid 310 automatically or manually.

The switch system 212 may selectively connect the supplemental power supply 112 to the main electrical grid 110, such as according to control signals from the controller 214. The switch system 212 may comprise any appropriate switch system for connecting and disconnecting the supplemental power supply 112 to and from the main electrical grid 110, such as conventional high-power switch systems. In the present embodiment, the switch system 212 facilitates a parallel mode to allow connection of the supplemental power supply 112 to the grid 110, as well as disconnection from the grid 110 to support an island mode, such as to permit the supplemental power supply 112 to independently provide power to the load 116 without power drawing from the main electrical grid 110.

In one embodiment, the switch system 212 includes a switchgear for switching, controlling, and/or protecting electrical circuits and equipment. The switchgear may comprise any appropriate elements, such as switches, fuses, contactors, isolators, circuit breakers, relays, control panels, lightning arrestors, current transformers, and potential transformers. In one embodiment, the switchgear facilitates bi-directional current flow, such as to and from the main electrical grid 110 and the microgrid 310. The switchgear may also be configured to switch between operation in parallel and in series with a load, such as switching between supplying power to the main electrical grid 110 from the microgrid 310 in a parallel configuration and a series configuration (i.e., island mode). The switch system 212 may also include communication connections, allowing for data to be accessible remotely and locally.

In the present embodiment, the switch system 212 includes medium voltage, such as 15 kV, breakers connected between the power supply system 100 and the main electrical grid 110. Synchronization for seamless return to receiving power from the main electrical grid 110 may occur at these breakers. The breakers may be electrically-operated and capable of remote control and/or local control, such as by switchgear-mounted switches. The switch system 212 may further include protective relays, such as protective relays connected to each generator and/or other power source in the supplemental power supply 112. The switch system 212 may also provide additional protective functions and elements, such as arc flash detection relay(s), differential protection, and zone-selective interlocking.

The switch system 212 may also facilitate asymmetrical loading. For example, the microgrid 310 may be providing power using all of the power-generating assets. In response to load requirements, the switch system 212 may facilitate the deactivating or otherwise unloading one or more of the power-generating assets. For example, main controller 214 may receive measurements of load, such as in volt-amperes. If the load is decreased or drops below a threshold, the main controller 214 may signal the switch system 212 to disconnect one or more generators from the load or shut down the one or more generators.

The switch system 212 may further facilitate load shedding, such as to action to reduce the load on microgrid 310 generating assets. If selected conditions occur, such as the load exceeding a selected threshold or election to reduce the number of operating generating assets, the switch system 212 may be used to terminate supply to certain circuits, such as those supplying nonessential systems.

The switch system 212 may also facilitate providing electricity of different characteristics, such as different voltages and frequencies. For example, the switch system 212 may facilitate providing household power at about 120 volts and 60 Hz low voltage internal power to one or more supply lines and from one or more sources.

The sensors 210 may be connected to the main controller 214 in any appropriate manner for the particular application or environment. For example, the sensors 210 may be connected via protective relays including power system protection, monitoring, and control applications, such as SEL-351 protection system relays from Schweitzer Engineering Laboratories or similar. In one embodiment, the SEL-351 smart relay is configured to monitor the frequency signals from the sensors 210 and, in the event of a deviation, such as from a target condition, selected frequency range, or from an expected operational profile, send a corresponding signal to the main controller 214.

The main controller 214 autonomously and/or manually responds to the sensor 210 and controls the switch system 212, for example to address power quality events detected on the main electrical grid 110. The main controller 214 may perform any appropriate tasks to respond to quality events, such as monitor power from the grid 110 via the sensors 210, process sensor 210 data to detect quality events, control the activation and deactivation of the supplemental power supply 112, and connect and disconnect the supplemental power supply 112 from the grid 110. The main controller 214 may be implemented according to any suitable hardware and/or software solution.

For example, the main controller 214 may comprise a dedicated hardwired main controller 214 configured to control the supplemental power supply 112 and its connection to the main electrical grid 110 according to data received from the sensors 210. In other embodiments, the main controller 214 may comprise a computer system using a processor and memory to execute a series of instructions and/or one or more programmable logic circuits configured to process the sensor 210 data and issue appropriate control signals. In one embodiment, the main controller 214 is implemented to include a control loop feedback system, such as a proportional-integral-derivative (PID) controller, which responds to an error value corresponding to the difference between a desired setpoint and a measured value and applies a correction based on proportional, integral, and derivative terms.

The main controller 214 and relay monitors power from the main electrical grid 110 via the sensor 210 and detects power quality events. A power quality event may comprise any deviation from a particular desired condition, such as a deviation of a particular magnitude or other characteristic. For example, a quality event may comprise a deviation from a target voltage level (overvoltage or undervoltage) or frequency. In various embodiments, a deviation from a nominal frequency, such as 60 Hz, may indicate an impending power supply problem, such as an unplanned power reduction or power loss on the grid 110. The main controller 214 may implement an AFR protocol to provide supplemental power to the main electrical grid 110 in the event of a frequency deviation or other frequency anomaly.

In response to a detected quality event, the main controller 214 may control the supplemental power supply 112. For example, if the quality event comprises a frequency reduction below a selected threshold, such as 59.967 Hz, the main controller 214 may start all or a portion of the supplemental power supply 112 assets. The main controller 214 may monitor the status of the supplemental power supply 112 and, when the supplemental power supply 112 is ready, seamlessly connect the supplemental power supply 112 to the grid 110. The main controller 214 may monitor the grid 110 power for termination of the quality event. When the quality event is terminated or decreasing, the main controller 214 may disconnect the supplemental power supply 112 from the grid 110, gradually or completely, and may further deactivate or decrease the power generation from the supplemental power supply 112.

In one embodiment where the supplemental power supply 112 comprises a microgrid 310 including multiple power generation assets, the main controller 214 may be configured to monitor and control all of the microgrid 310 assets locally. The various microgrid 310 assets may be controlled as needed via the main controller 214, such as automatically or by local or remote intervention.

The main controller 214 may comprise a conventional computer, such as a standard desktop computer, adapted to control and communicate with various systems, such as in conjunction with the General Electric Proficy Process System or other appropriate system for process automation and control. In one embodiment, the main controller 214 responds to frequency signals from the sensors 210 to maintain precision control over the supplemental power 112 assets, including rotating equipment and/or non-spinning equipment.

Figure 8:
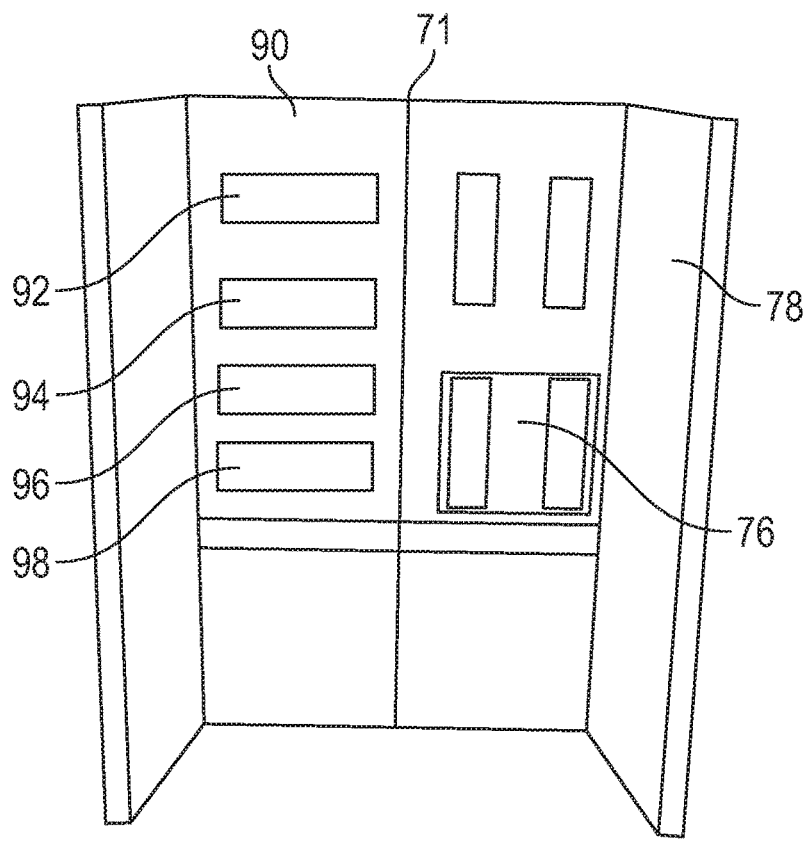
FIG. 8 is a front perspective view of a controller and switchgear housed in a switchgear module.

In one embodiment, the main controller 214 may operate in proximity to or be integrated with the switchgear, such as described in U.S. Pat. No. 8,427,005 issued Apr. 23, 2013 to Kisner, et al. For example, referring to FIG. 8, one embodiment of the switchgear 71 may be housed in a switchgear module. The switchgear module 71 houses the main controller 214, such as a controller 90 to operate multiple paralleling of the supplemental power supply 112. The switchgear module 70 may also include a drawout circuit breaker 76 and closeable front panel doors 78. The controller 90 may be in electrical communication with the supplemental power supply 112 and control the output and load scheme of each of each element of the supplemental power supply 112.

For example, the controller 90 may control each generator's power output in response to either a predetermined or failure event power load demand. Further, one embodiment of the controller 90 includes a built-in safety feature: if one generator or other component fails, or is otherwise bypassed, the remaining generators may continue to operate. For example purposes only, a 2.4 MW unit comprising four paralleled 600 kW generators that loses one engine will still have the ability to produce 1.8 MW with the three remaining generators.

In particular embodiments, the controller 90 provides control and protection for a prime mover by allowing full control of a starter and fuel from a fuel tank throughout various applications. Further, in the event one of the engine-generators of supplemental power supply 112 is set up for control over the J1939 CANBUS protocol, such as the protocols detailed at www.canbus.us, www.can-cia.org/pg/j1939/additional/about j1939.html or similar protocols, the controller 90 may be able to not only send commands to the elements of the supplemental power supply 112 for starting, stopping, excitation, and throttle control, but is also able to receive data back from supplemental power supply 112 and display the information on a display 98 for the user. Programmable inputs in the generator control compartment 94 also provide protection from supplemental power supply 112 failures by allowing the user to monitor an analog and/or digital signal generated by controller 90. The control compartment 94 may also be used to optimize supplemental power supply 112 output and control the paralleling of the supplemental power supply 112 with the utility grid.

In particular embodiments, the switchgear 71 and controller 90 are used to parallel the supplemental power supply 112 with a utility grid, such as by synchronizing a generator signal to the bus and synchronizing a mains signal to the bus. The paralleling operation may provide protection, metering, control and switching elements in the master control compartment 92, the generator control compartment 94 and/or the utility control compartment 96 to manage load scheme(s) of the supplemental power supply 112, such as a block of generators, for parallel integration with the utility grid. For example, the controller 90 and parallel switchgear 71 may match the frequency, voltage, phase angle, and phase rotation of each generator module in a block of generators.

The controller 90 may meet, or exceed, the IEEE 1547 Specification interconnect requirements. In one embodiment, the controller 90 comprises a DEIF controller using a microprocessor. In this particular embodiment, the microprocessor-implemented controller 90 initiates a generator start command from a utility, or central control command, to start and synchronize the supplemental power supply 112 generators together. Further, the controller may synchronize the block of generators to the utility grid. In some embodiments the controller 90 can have all generators up to full power in less than 60 seconds, for example ten to thirty seconds, from the time of the command. Such a capability is particularly helpful in utility grids under stress to quickly and efficiently respond to a power failure event or power demand change.

In particular embodiments, the user may adjust the acceptable phase window and voltage delta necessary for control of a particular application. For illustrative purposes only, the controller 90 may incorporate phase matching or slip frequency techniques during the synchronization of the generator signal and/or the mains signal. Further, the controller 90 may incorporate dead bus paralleling and full breaker/contactor control.

In some embodiments, the drawout breaker 76 may include a generator breaker used to tie the generator bus to the utility bus. The drawout breaker 76 may also include a utility breaker that connects the control system 114 to the utility grid 110. A main breaker may be used to tie the generator bus to the utility bus. In some embodiments, the drawout breaker 76 may further include a distribution breaker to directly feed loads and transfer switches for parallel operation with the utility grid.

The controller 90 provides loading of the generators and precise output control, for example kw/var output control, to provide optimal control over the power module based on preset values. For instance, the controller 90 may determine individual generator power factor control. Further, the loading and output control may be fully programmable to allow remote access. In this particular embodiment, a remote access terminal can automatically curtail less important building loads in the event of a generator's failure during the loss of utility power. For example, if the failure rate of individual generators is about 2%, then the reliability of the power module assembly to important loads is about 99.96%, without the cost of adding redundant generators.

Further, in the event of a utility source failure, the controller 90 can create a precise output response. For example, the programmable controller 90 determines an exact outage condition and provides a response load. In particular embodiments, the programmed controller 90 may provide full control of generator time delays and a return period for returning to utility power at the completion of an outage. The return period may be either a closed transition or an open transition. In the event of a closed transition return, the controller 90 can provide a soft generator unloading.

Typically, controller 90 includes programmable flex logic to allow programmable logic control. This provides an opportunity to control ancillary equipment, both related and unrelated, to the power module 10. For example, the programmable flex logic may adjust site load to generator capacity in a backup mode, particularly if an individual generator were to fail or if site load increases above the generator's capacity. The controller 90 may also include an external digital/analog input output card to further enhance the control of the assembly. A microprocessor-based controller 90 may be programmed to yield these functions.

In yet another embodiment, a method for operating a power module, e.g. including any of the embodiments previously shown or described, includes operating the power supply 112, for example a block of enclosed generators, for generating a power load demand. The method includes activating the block of generators and controlling the controller 90 to selectively activate or deactivate the generators according to demand. Typically, controlling the controller 90 includes individually operating a generator in the block of generators in response to a power load demand.

In another embodiment, the method includes synchronizing the block of generators together as a unit. The method may also include synchronizing the block of generators to the main electrical grid 110. In particular embodiments, the controller 90 may be used to individually bypass a generator in the block of generators in response to a power load demand.

The control system 114 may also include additional controllers, such as engine controllers and group controllers to control specific equipment, such as individual or groups of generators or other assets. For example, a group controller may simultaneously control four generators. The additional controllers may operate in conjunction with any appropriate control solution, such as a system available from the DEIF Group. The additional controllers may start, stop, and otherwise control the various assets, such as the DERs, generators, and other systems, for example according to signals from the main controller 214.

The main controller 214 and various additional controllers may communicate in conjunction with any appropriate architecture and protocol. In one embodiment, the various controllers communicate via a Controller Area Network or CAN bus system. Controller communications may be facilitated with any appropriate system, however, including peer to-peer or other distributed communications, in conjunction with a host computer, or both. All controllers, PLCs, and the main controller 214 may operate continuously on CAN bus systems, which may facilitate continuous communication from and to all the PLCs, controllers, and sensors.

The controller 214 may place the control system 114 in various operating modes. The operating modes may provide the capability of islanded operation in the event of a grid outage, support power from the main electrical grid 110 for peak demand events or frequency events, implement AFR in the event of the main electrical grid 110 frequency dropping below a set point, black start the microgrid 310, and/or respond to other conditions and signals. For example, the control system 114 may configure the power supply system 100 according to one or more of the following control modes islanded from and/or paralleled to the main electrical grid 110. The control system 114 may also provide various modes of operation using faster-starting resources, such as DC power generation resources like solar, photovoltaic, and battery, and/or accommodate slower-starting resources, such as AC power generation resources like inactive diesel or natural gas generators, or any combination thereof.

Black Start Islanding mode facilitates a black start of the load following a complete loss of power from the main electrical grid 110. The load 116 and the supplemental power supply 112 form a power island, and the control system 114 disconnects them from the main electrical grid 110 via the switch system 212. In this mode, the supplemental power supply 112 does not prevent a loss of power to the load (no ride-through capability) unless connected to an available power source, such as high-power battery. In this mode, the control supply 112 may start the power sources in the supplemental power supply 112, such as the generators, and restore full power within a certain period following loss of power from the main electrical grid 110, such as less than 30 seconds. Once main electrical grid 110 power is restored, the control system 114 may perform a seamless transfer back to main electrical grid 110 power and shut down the supplemental power supply 112. In one exemplary embodiment, the control system 114 monitors the main electrical grid 110 for stability for 30 minutes, and then seamlessly returns the load 116 back to the main electrical grid 110.

If the supplemental power supply 112 includes fast-starting power sources, the total time from loss of utility power to restoration of full power may be within a particular required period, such as less than one second using ride-through power, such as from batteries.

For example, the control system 114 may detect a loss of power from the main electrical grid 110, such as from the sensor 210 or other signal. The control system 114 may enter black start islanding mode by starting the supplemental power supply 112 resources. If fast-start resources are available in the supplemental power supply 112, such as batteries or spinning reserves, the control system 114 may check the status of such resources to confirm their readiness. Slower-responding resources may begin to ramp up to a ready state.

When ready, the signal generated by the supplemental power supply 112 may be synchronized to the load if the load is still running. The control system 114 may disconnect the main electrical grid 110 from the load and connect the supplemental power supply 112 to the load via the switch system 212.

In one embodiment, the control system 114 may automatically black start critical load elements, for example following a complete loss of power from the main electrical grid 110. The control system 110 may create a powered island by disconnecting the load 116 from the main electrical grid 110 and activating the supplemental power supply 112, if it is not already activated and available to supply power.

In one embodiment, the control system 114 detects the outage or impending outage, such as via the sensor 210, and provides power from DC power generation resources, such as battery power, to the AC bus via the DC common bus 612 and the inverter 614, such as within 1 second. After the DC power generation resources repower the load, or elements of the load such as critical load, the control system 114 may start the slower-starting resources, such as generators, and sync the slower-starting resources to the battery-energized AC bus 616. When the slower-starting resources are supplying the critical load, the control system 114 may disconnect the fast-responding resources like the batteries from the AC bus 616, allowing the generators and/or other slower-starting resources to supply power to the load 616 or the critical load until the main electrical grid 110 power is reestablished.

When power from the main electrical grid 110 has been restored, the control system 114 may transition back to the main electrical grid 110, such as in a manner that is seamless to the load 116 or critical elements of the load. For example, the control system 114 may synchronize the signal provided to the load 116 with the main electrical grid 110 signal. The control system 114 may then connect the load 116 to the main electrical grid 110 and disconnect the supplemental power supply 112 via the switch system 212. The control system 114 may then return the supplemental power supply 112 to a ready state, such as initiating cool-down procedures, recharging energy storage elements, and/or re-initiating systems.

Intentional islanding mode allows for intentional islanding in the event of impending loss of power from the main electrical grid 110, such as a planned loss of power or disconnection from the main electrical grid 110, for example in the event of upstream utility maintenance events or required system maintenance or drills. Intentional islanding mode may be entered in response to a manually activated signal provided by an operator or other appropriate signal. In various embodiments, intentional islanding mode can be initiated locally or remotely by an operator or maintenance providers.

For example, the control system 114 may initiate an automated sequence to start power generation by the supplemental power supply 112, such as in response to a manual signal or an automated signal from the sensor 210 or other source. The control system 114 may parallel the power from the supplemental power supply 112 to the load, ramp up power output until it matches the load, and then disconnect the main electrical grid 110 to island the supplemental power supply 112 and the load.

The control system 114 may return the load to grid-connected operation, for example in response to a manual or automatic signal, by initiating an automated sequence to perform a seamless transfer back to power from the main electrical grid 110. The control system 114 may effect intentional islanding from initiation signal to full power within a selected period, such as less than 30 seconds or less, and less than one second for critical elements or even the entire load if the supplemental power supply 112 includes sufficient fast-starting resources.

In grid load management/demand response mode, the control system 114 can respond to a signal, such as a manual signal or an automatically generated signal, and command the supplemental power supply 112 to start and synchronize to the load 116, and then produce a required amount of power indefinitely to remove the load 116, partly or fully, from the main electrical grid 110. For example, the control system 114 may enter grid load management/demand response mode in the event the main electrical grid 110 becomes unstable, such as when the sensor 210 indicates that the power available from the main electrical grid 110 drops below a target value, such as a particular programmed voltage threshold.

In grid load management/demand response mode, the control system 114 may automatically isolate the load 116 from the main electrical grid 110. The control system 114 may activate fast-responding elements of the supplemental power supply 112, if available, as well as slower-starting elements. When the elements of the supplemental power supply 112 have started, they may be synchronized to the main electrical grid 110 signal. The control system 114 may then disconnect the load 116 (or critical elements of the load 116) from the main electrical grid 110 and connect the relevant elements of the load 116 or the entire load 116 to the supplemental power supply 112 or the available elements of the supplemental power supply 112 via the switch system 212. If the supplemental power supply 112 includes elements that are slower starting than other elements, the control system 114 may connect critical load 116 elements to the faster-responding supplemental power supply 112 elements first, and then connect the entire load 116 or a portion of the load 116 to the slower-starting elements as they become available.

Upon grid stability being restored, the control system 114 may transition back to the main electrical grid 110, such as in a manner that is seamless to the load 116 or critical elements of the load 116.

In Autonomous Frequency Response mode, the control system 114 may continuously monitor the source frequency on the main electrical grid 110. If the frequency drops below a target frequency for a selected period, such as below 59.92 Hz for more than 2 seconds, the control system 114 automatically starts one or more power resources of the supplemental power supply 112, such as all available resources, synchronizes them to the main electrical grid 110, and connects the supplemental power supply 112 to the main electrical grid 110. The control system 114 may provide power to the main electrical grid 110 to support the frequency, such as using a PID control loop to adjust the combined output of all generators and other resources of the supplemental power supply 112 to attempt to hold the main electrical grid's 100 frequency at a target, such as 59.98 Hz. In one embodiment, the control system 114 provides full power output from the supplemental power supply 112 to the main electrical grid 110 within a selected time, such as within 20 seconds of receiving a signal from the sensor 210.

When grid frequency is restored to a target for a selected amount of time, such as above 59.98 Hz without the assistance of the supplemental power supply 112 for five minutes, the control system 114 may automatically step down and/or shut down the supplemental power supply 112, such by sequentially shutting the generators down after a pre-set delay and in accordance with recommended cool down procedures. In one embodiment, no manual action is required for this mode of operation. By supporting the main electrical grid 110 with the supplemental power supply 112 using autonomous frequency response, the supplemental power supply 112 can provide significant improvement in service reliability and significant reduction in trip events of sensitive equipment caused by grid frequency deviations.

In Autonomous Reconfiguration mode, the control system 114 may autonomously reconfigure the power supply connections to the load to address faults in the power supply to the load. In various embodiments, the control system 114 may monitor the power quality provided at any particular point in the system 100, such as from the main electrical grid 110, from one or more resources of the supplemental power supply 112, and/or at critical loads 116. If the power quality at the monitored point exhibits an event, such as a voltage or frequency drop, the control system 114 may autonomously provide power from another source to the point.

For example, referring to FIG. 6, the main electrical grid 110 may provide multiple feeds 110A, 110B to the system 100. Power is routed to various elements in the system 100 via switches, such as switches 52 M1, 52 M2, 52 TA, 52 TB, which enable the control system 114 to reconfigure power routing to keep loads 116 at full capability. The control system 114 may continuously monitor the state of the power availability and quality, such as the power received from the main electrical grid 110 feeds. If a failure is detected, such as a power quality issue for a critical circuit or other issue, the control system 114 may autonomously reconfigure around the fault, restoring power without the need for any manual switching or physical maintenance.

For example, if a first utility feed 110B loses power, the controller 214 may open the switch 52 M2 and close the switches 52 TA, 52 TB to isolate the dead first utility feed 110B. Power is rerouted from the operating utility feed 110A via switch 52 M1 into the circuits that were previously fed by 52 M2. When the power from the first utility feed 110B returns, the controller 214 may sense the return of utility power, open switches 52 T1, 52 T2, and close switch 52 M2 to restore power. Unlike conventional systems, autonomously reconfiguring the power supply routes facilitates failure recovery without operator or technician intervention.

The control system 114 may also implement a test mode, such as to perform scheduled facility testing and post maintenance testing to ensure all systems perform as required. In one embodiment, the control system 114 may respond to local control or remote control by end users and/or maintenance providers. Entry into test mode may be scheduled or initiated upon request.

The control system 114 may implement any appropriate process to monitor the grid 110 power to sense and respond to a quality event. For example, a method of operating the microgrid 310 capable of connecting to the main electrical grid 110 supplying electrical power at a frequency may comprise providing a signal from the sensor 210 to the controller 214. The signal corresponds to the frequency of the electrical power from the main electrical grid 110. The method may further include comparing the frequency of the electrical power from the main electrical grid 110 to a first threshold using the controller 214 and automatically providing power from the microgrid 310 to the main electrical grid 110 if the frequency of the electrical power from the main electrical grid 110 crosses the first threshold. The first threshold is between 59 and 60 Hz. The method may include automatically providing power from the microgrid 310 to the main electrical grid 110 only if the frequency of the electrical power from the main electrical grid 110 crosses the first threshold and remains across the first threshold for at least a pre-selected duration, such as at least two seconds.

The method may further comprise comparing the frequency of the electrical power from the main electrical grid 110 to a second threshold using the controller 214, and automatically reducing power from the microgrid 310 to the main electrical grid 110 if the frequency of the electrical power from the main electrical grid 110 crosses the second threshold. The method may include automatically repeatedly reducing power from the microgrid 310 to the main electrical grid 110 if the frequency of the electrical power from the main electrical grid 110 remains across the second threshold for a selected duration, such as five minutes. In addition, the method may include increasing power from the microgrid 310 to the main electrical grid 110 if the frequency of the electrical power from the main electrical grid 110 does not remain across the second threshold for the selected duration.

In various embodiments, automatically providing power from the microgrid 310 to the main electrical grid 110 if the frequency of the electrical power from the main electrical grid 110 crosses the first threshold comprises starting a plurality of stopped generators of the microgrid 310, waiting a ramp-up time, such as no more than 20 seconds, for the generators to provide a selected power output, and connecting the generators to the main electrical grid 110 after the ramp-up time. Automatically providing power from the microgrid 310 may also include providing power to the main electrical grid 110 from a DC source of the microgrid 310 during the ramp-up time.

In one exemplary embodiment, an exemplary control system 114 may receive sensor 210 signals indicating the grid 110 power frequency. The sensors 210 may monitor the relevant parameters continuously, including grid electricity parameters, limits from the additional controllers, load parameters, and parameters relating to the microgrid generating assets.

Using AFR, the control system 114 automatically responds to a frequency event comprising a frequency drop below a selected threshold, such as 59.96 Hz, for a selected duration, such as two seconds. The threshold and duration may be selected according to any appropriate criteria, such as desired sensitivity.

The control system 114 may respond to the quality event by supplementing the main electrical grid's 110 power with power from the supplemental power supply 112, such as the microgrid 310, and may optimize the response. In one embodiment, the main controller 214 responds to the frequency event by transmitting a start signal to the microgrid 310 to start any or all of the power generation assets that are not already running. When the various power generation assets are ready, the control system 114 may synchronize the supplemental power supply 112 power to the grid 110 and connect the microgrid 310 to the main electrical grid 110 via the switch system 212.

In one embodiment, the control system 114 automatically starts all available microgrid 310 generators, synchronizes the generators to the grid 110, and then utilizes a PID control loop to adjust the combined output of all microgrid 310 generators to attempt to hold the grid's 110 frequency at a minimum of 59.98 Hz. Connection and generation to the main electrical grid 110 may occur within a selected time, such as within 20 seconds or less from detection of the frequency event.

The control system 114 may monitor the main electrical grid 110, such as via the sensor 210, for termination of the quality event. In one embodiment, when the frequency returns to a selected threshold and remains above the threshold for a selected duration, the control system 114 may reduce or terminate the power contribution by the microgrid 310. For example, when the grid 110 frequency is restored to above 59.98 Hz for at least two minutes, the control system 114 may disconnect one or more of the generators and automatically shut the disconnected generators down, such as in accordance with recommended cool-down procedures. The threshold and duration criteria for identifying the end of the quality event may be selected according to any appropriate criteria. In various embodiments, no operator or dispatch center action is required for connecting or disconnecting the microgrid 310 or controlling the microgrid 310 components.

The control system 114 may continue to monitor the main electrical grid 110 power to ensure that the quality event remains terminated, even while elements of the supplemental power supply 112 are being disconnected from the main electrical grid 110. If the quality event returns, the control system 114 may reconnect the supplemental power supply 112. For example, if the frequency event returns as the microgrid's 310 power generation assets are gradually disconnected, the control system 114 may reconnect all or a portion of the microgrid 310 generators and other assets to the main electrical grid 110. In the present embodiment, the control system 114 monitors the main electrical grid 110 power frequency, and if the frequency event recurs, the control system 114 immediately reconnects all of the generators to the main electrical grid 110 and starts the AFR protocol anew.

For example, in one exemplary process, the sensors 210 monitor the main electrical grid 110 frequency, such as using frequency sensors placed on the line side of breakers 516A-B connected to the main controller 214 via protective SEL-351 relays and/or a redundant SEL-700GT relay. If the main grid frequency drops beyond a particular threshold, such as at or below 59.96 Hz, for a selected amount of time, such as for two seconds, the main controller 214 initiates the microgrid's 310 power generation assets. The main controller 214 may also determine whether to begin connecting the microgrid's 310 assets to the main electrical grid 110 according to any other suitable criteria, such as whether the main electrical grid 110 frequency is below the a particular frequency threshold, such as a 59.5 Hz under frequency threshold which initiates Black Start Mode, i.e., disconnecting the load 116 from the main electrical grid 110 until the main electrical grid 110 power returns to acceptable levels.

Upon the signal from the main controller 214, all microgrid 310 assets, such as the power generation blocks 510(1) to 510(10), may receive a start command. All assets start and reach operating conditions, such as a rated voltage and frequency for rotating generators. Each generator controller synchronizes the corresponding generator(s) 512 to the main electrical grid 110. Upon synchronization, each generator controller connects to the main electrical grid 110, such as by closing a breaker 52-G1 to 52-G40. Upon breaker closing, each generator controller ramps the generator 512 to a Limited Time running Power (LTP) rating within a certain time, such as within 20 seconds of the start command. The generator 512 may be selected to achieve this performance. The generator controllers maintain the LTP rated power output of the generators 512 and a desired power factor (typically 1.0).

Once the generators 512 are online, the main controller 214 continues to monitor the main electrical grid 110 frequency via the relays and sensors 210. The main controller 214 may compare the main electrical grid 110 frequency to one or more thresholds and take action accordingly. For example, if the main electrical grid 110 frequency reaches 59.98 Hz or more for five consecutive minutes, the main controller 214 may reduce power supplied to the main electrical grid 110 from the supplemental power supply 112. In the present embodiment, the main controller 214 may begin by unloading one or more power blocks 510 and generators 512. For example, the main controller 214 may remove generation based on the number of operating hours for the generators 512, such as removing the generators 512 with the highest operating hours first. If the main electrical grid 110 frequency drops below 59.98 Hz, the main controller 214 may cause all power blocks 510 to resume the load and the 5-minute timer starts over. If the main electrical grid 110 frequency remains above 59.98 Hz for a selected duration, such as for five minutes, the main controller 214 may continue the unloading process with the next generator 512.

This continues for all power blocks 510 until (1) all of the power blocks 510 are off line, or (2) the grid frequency drops to 59.98 Hz, which restarts the process. If the grid frequency falls below 59.98 Hz a second time while unloading any power block 510, the main controller 214 may place all power blocks 510 back online and suspend unloading for 30 minutes (instead of the normal 5 minutes). If the power block 510 unloads successfully, the timer resets to the normal 5 minutes and the sequence continues. When all of the generators 512 are unloaded and the main electrical grid 110 frequency remains above 59.98 Hz, the generators 512 may enter a cooling period, such as five minutes.

In one embodiment, the system may measure frequency response to a main electrical grid 110 event, such as at 20 and 50 seconds after the event start. The measurements may be analyzed, such as by averaging the values, to determine whether a utility has responded to the event. If the average is below the agreed response threshold, the utility may be subject to penalties. As a result, a frequency responding resource should achieve full output within 20 seconds.

The AFR protocol may also operate in conjunction with a series of different modes, such as test modes, overvoltage modes, and island modes (i.e., isolating the site from the main electrical grid 110 and supplying the site solely from the microgrid 310). The control system 114 may autonomously reconfigure the various elements of the system in response to signals from the sensors 210.

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise," "comprises," "comprising," "having," "including," "includes," or any variations of such terms, are intended to reference a nonexclusive inclusion, such that a process, method, article, composition, or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

The invention claimed is:

1. A control system for controlling electrical power flowing between a main conventional publicly accessible electrical grid providing main electrical grid power having a frequency, a supplemental power system, and a load, comprising:
   a switch system, wherein the switch system selectively connects the supplemental power system to the main conventional publicly accessible electrical grid; and a controller responsive to the main conventional publicly accessible electrical grid power frequency and controlling the switch system, wherein the controller
  compares the main conventional publicly accessible electrical grid power frequency to a first threshold; and
  autonomously causes the switch system to connect the supplemental power system to the main conventional publicly accessible electrical grid in response to the frequency of the main conventional publicly accessible electrical grid power crossing the first threshold.

2. A control system according to claim 1, wherein the supplemental power system includes multiple generators, and the controller controls the output of each generator.

3. A control system according to claim 1, wherein the supplemental power system includes multiple generators, and the controller synchronizes the generators to the main conventional publicly accessible electrical grid.

4. A control system according to claim 1, wherein the supplemental power system includes multiple generators, and the controller matches the frequency and phase angle of each generator to the main conventional publicly accessible electrical grid.

5. A control system according to claim 1, wherein the controller automatically causes the switch system to connect the supplemental power system to the main conventional publicly accessible electrical grid only if the frequency of the electrical power from the main conventional publicly accessible electrical grid crosses the first threshold and remains across the first threshold for at least a pre-selected duration.

6. A control system according to claim 1, wherein the controller further:
  automatically compares the frequency of the electrical power from the main conventional publicly accessible electrical grid to a second threshold; and
  automatically reduces power from the supplemental power system to the main conventional publicly accessible electrical grid if the frequency of the electrical power from the main conventional publicly accessible electrical grid crosses the second threshold.

7. A control system according to claim 6, wherein the controller further automatically and repeatedly reduces power from the supplemental power system to the main conventional publicly accessible electrical grid if the frequency of the electrical power from the main conventional publicly accessible electrical grid remains across the second threshold for a selected duration.

8. A control system according to claim 7, wherein the controller further increases power from the supplemental power system to the main conventional publicly accessible electrical grid if the frequency of the electrical power from the main conventional publicly accessible electrical grid does not remain across the second threshold for the selected duration.

9. A control system operating in conjunction with a main conventional publicly accessible electrical grid, a microgrid, and a local load, comprising:
  a switch system, wherein the switch system selectively connects the microgrid to the main conventional publicly accessible electrical grid;
  a sensor responsive to a frequency of a power signal provided by the main conventional publicly accessible electrical grid;
  a controller responsive to the sensor and controlling the switch system, wherein the controller:
    compares the frequency of the power signal to a first threshold;
    autonomously activates the microgrid if the frequency of the power signal drops below the first threshold for at least a first pre-selected duration;
    autonomously signals the switch system to connect the microgrid to the main conventional publicly accessible electrical grid after a ramp-up time of the microgrid;
    after the microgrid is connected to the main conventional publicly accessible electrical grid, autonomously compares the frequency of the power signal to a second threshold; and
    autonomously disconnects the microgrid from the main conventional publicly accessible electrical grid if the frequency of the power signal remains above the second threshold for a second pre-selected duration.

10. A control system according to claim 9, wherein the microgrid comprises multiple generators, and the controller further:
  autonomously disconnects at least one generator but fewer than all of the generators from the main conventional publicly accessible electrical grid if the frequency of the power signal remains above the second threshold for at least five minutes; and
  autonomously disconnects additional generators from the main conventional publicly accessible electrical grid if the frequency of the power signal remains above the second threshold for subsequent periods of at least five minutes.

11. A control system according to claim 9, wherein the microgrid includes multiple generators, and the controller controls the output of each generator.

12. A control system according to claim 9, wherein the microgrid includes multiple generators, and the controller synchronizes the generators to the main conventional publicly accessible electrical grid.

13. A control system according to claim 9, wherein the microgrid includes multiple generators, and the controller matches the frequency and phase angle of each generator to the main conventional publicly accessible electrical grid.

14. A control system according to claim 9, wherein the first threshold is between 59.9 and 60 Hz.

15. A control system according to claim 9, wherein the pre-selected duration is at least two seconds.

16. A control system according to claim 9, wherein the ramp-up time of the microgrid is no more than 20 seconds.

17. A control system according to claim 9, wherein the second threshold is about 59.98 Hz.

18. A control system according to claim 9, wherein the second pre-selected duration is at least five minutes.

19. A control system according to claim 9, wherein the controller further automatically and repeatedly reduces power from the microgrid to the main conventional publicly accessible electrical grid if the frequency of the electrical power from the main conventional publicly accessible electrical grid remains across the second threshold for the second pre-selected duration.

20. A control system according to claim 19, wherein the controller further increases power from the microgrid to the main conventional publicly accessible electrical grid if the frequency of the electrical power from the main conventional publicly accessible electrical grid does not remain across the second threshold for the second pre-selected duration.

21. A control system according to claim 9, wherein the controller automatically causes the switch system to connect the microgrid to the main conventional publicly accessible electrical grid after:
- starting a plurality of stopped generators of the microgrid; and
- waiting a ramp-up time for the generators to provide a selected power output.

22. A control system according to claim 21, wherein the microgrid includes a DC source; and
- the controller automatically causes the switch system to connect the DC source to the main conventional publicly accessible electrical grid within one second after the frequency of the electrical power from the main conventional publicly accessible electrical grid crosses the first threshold and for the duration of the ramp-up time.

23. A control system according to claim 9, wherein the switch system comprises a bidirectional paralleling switchgear that delivers power to the grid and/or load.

* * * * *